United States Patent Office 3,467,556
Patented Sept. 16, 1969

3,467,556
HIGH TEMPERATURE SOLDERING OIL
Robert A. Stayner, Palos Verdes Estates, Calif., assignor to Chevron Research Company, San Francisco, Calif., a corporation of Delaware
No Drawing. Filed Sept. 28, 1966, Ser. No. 582,494
Int. Cl. C10m 1/02
U.S. Cl. 148—25        5 Claims

ABSTRACT OF THE DISCLOSURE

Refined petroleum hydrocarbon stock is combined with small amounts of a fatty acid having one site of olefinic unsaturation, a glyceride and a phenolic antioxidant for use as a high temperature soldering oil.

---

This invention concerns a novel method for soldering or tinning electrical circuits, particularly printed circuits, and compositions used therein. More particularly, this invention concerns a novel method for soldering or tinning electrical circuits using a novel soldering oil and the composition thereof.

The advent of the printed circuit has greatly facilitated the rapid production of accurately connected sophisticated electrical circuits. However, the demands on the soldering devices to enhance their efficient use are continuously increasing. In many devices, oil is used with the solder to provide a better distribution of the solder on the areas to be coated, to aid in removal of the excess solder, to protect the solder from oxidation or discoloration while being cooled, and to keep the hot solder clean by providing a protective coating. In one particular device, solder and soldering oil are pumped together continuously to form a wave through which the printed circuit board is passed. The continuous interaction of the hot solder and oil makes great demands on the oil as to heat and oxidation stability.

It has now been found that excellent soldering, particularly of printed circuits in a continuous manner, can be achieved by using in combination with the molten solder, a soldering oil obtained by adding to a paraffinic base stock a straight chain fatty acid of from 14 to 20 carbon atoms, a glycerol triester, wherein the carboxylic acid groups are of from 14 to 20 carbon atoms and a phenolic antioxidant. By using the combination described above, smoking is minimized, the useful life of the soldering oil is greatly extended, enhanced control of the amount of solder applied is achieved, as well as other advantages which will become evident from the subsequent discussion.

The soldering oil composition will have a flash point of at least 450° F. (ASTM D-92), and generally from about 460° to 520° F., a fire point of at least 480° F. (ASTM D-92), and generally from about 500° to 560° F., and a pour point generally lower than 25° F. and preferably lower than 20° F.

The paraffinic mineral oil base is any suitable refined petroleum hydrocarbon stock having high flash and fire points and which is substantially stable at the soldering temperatures of from about 450° to 500° F. Suitable hydrocarbon base stocks which can be used are solvent extracted and hydrotreated Mid-Continent bright stock, acid treated Mid-Continent bright stock, and blends of these oil stocks with minor amounts of other oil stocks. Usually, solvent extracted and hydrotreated Mid-Continent bright stock having a Saybolt Universal viscosity in seconds at 210° F. of from about 160 to 200, preferably of from about 180 to 190, is used as the oil base stock.

The fatty acid which finds use is of from 14 to 20 carbon atoms, preferably of from 16 to 18 carbon atoms, has one site of olefinic unsaturation, either cis or trans, and is straight chain, that is, free from alkyl branching. Illustrative acids include petroselinic, palmitoleic, oleic, elaidic, etc.

The glycerides or fatty oils which find use are those having carboxylic acids of from 14 to 20 carbon atoms, more usually of from 16 to 18 carbon atoms and are the nondrying oils, having iodine numbers in the range of 50 to 90, more usually in the range of 60 to 80. (Iodine number D-555, the number of grams of iodine absorbed under standard conditions by 100 g. of fat.) These fatty oils known as nondrying oils, retain a significant amount of aliphatic unsaturation, both monoolefinic and diolefinic carboxylic acids being present in the oil. Illustrative fatty oils include lard oil, tallow-mutton oil, peanut oil, etc.

These oils have at least 40 weight percent of the carboxylic acids as monoolefinic, and at least 80 weight percent of the carboxylic acid are either saturated or monoolefinic. Small amounts of acids having greater than 20 carbon atoms or fewer than 14 carbon atoms may be present, the total amount of these acids not exceeding about 5 weight percent.

The oils used have a smoke point of at least 250° F. and, generally, from about 260° to about 360° F. The flash point will be at least 500° F., while the fire point will be at least 600° F. The pour point will be less than about 50° F. and, preferably, less than about 45° F.

The phenolic antioxidant has from 1 to 2 phenolic rings, preferably 2 phenol groups, and will be of from 14 to 30 carbon atoms, preferably a bisphenol of from 16 to 30 carbon atoms. The phenolic rings may be joined together by a bond or an alkylene group, i.e., methylene, and may be substituted or unsubstituted; if substituted, substituted by lower alkyl groups, e.g., methyl, tert.-butyl, etc., preferably tert.-butyl. Illustrative phenolic antioxidants are 2,2'-methylene bis(4-methyl-6-tert.-butyl phenol), 2,6-di-(tert.-butyl) p-cresol, 4,4'-methylene bis(2,6-di-tert.-butyl phenol), etc.

The soldering oil composition will generally contain at least about 80% of the hydrocarbon oil and more usually from about 85 to 94% by weight of the hydrocarbon oil. The fatty acid and glyceride will each be present in from about 3 to 8 weight percent, more usually about 5 weight percent and preferably will be present in approximately equivalent amounts. The antioxidant will be present in at least about 0.01 weight percent, and preferably from about 0.1 weight percent to about 0.5 weight percent.

In order to test the compositions of this invention, an exemplary composition was prepared comprising 90 weight percent Mid-Continent 185 bright stock, 5% lard oil having a saponification number of 192–198 mg. KOH/g. (ASTM D-94), and iodine number of 60–75 (ASTM D-555); 5 weight percent oleic acid and 0.25 weight percent of a phenolic antioxidant 4,4'-methylene bis(2,6-di-tert.-butyl phenol).

The properties of the final product were as follows: flash point, 480° F. (ASTM D-92); fire point, 500° F. (ASTM D-92); viscosity at 210° F., SSU, 139.3; acid number, 12.2 mg. KOH/g. (ASTM D-664); saponification number, 20 mg. KOH/g. (ASTM D-94); pour point, 15° F.

The above composition was tested for storage life and stability to heat in comparison to a commercially available soldering oil recommended for use with automatic soldering machines. In order to test storage stability, 4-ounce samples were stored at room temperature and 44° F. The samples were visually examined at successive time intervals. The following table indicates the results:

TABLE I

| | Time | Example | Commercial product |
|---|---|---|---|
| At room temperature | 16 hrs | No change | Trace oil separated. |
| | 3 days | do | 1/16" free oil. |
| | 3 weeks | do | Do. |
| At 44° F | 16 hrs | Viscous homogeneous flowable fluid. | Solid wax. |
| | 3 days | do | Do. |
| | 3 weeks | do | Do. |

In order to test heat stability, 100 g. samples were placed in 6-ounce tins without lids and heated at 480° F. for 2 hours. The colors of the samples and the percent of insoluble material was determined both before and after the heat treatment.

TABLE II

| | Example | Commercial product |
|---|---|---|
| Before heating: | | |
| Color (ASTM dilute) | <4.0 | <4.5 |
| Pentane insol., percent | <0.1 | <0.1 |
| Benzene insol., percent | <0.1 | <0.1 |
| After heating: | | |
| Color (ASTM dilute) | D-8 | D-8 |
| Pentane insol., percent | 0.01 | 2.9 |
| Benzene insol., percent | Nil | 2.1 |

These results demonstrate that the exemplary product of this invention does not separate and can be readily poured even at relatively cold temperatures which are found in commercial use. Moreover, the amount of insoluble material produced at temperatures common to automatic soldering devices is far less than a presently available commercial product. This means that the compositions of this invention will permit efficient use of the oil for longer periods of time, with obvious cost and time advantages.

When the soldering oil was used in combination with solder in a Hollis automatic soldering apparatus, in comparison to a commercial product previously used, the product was found to have less smoke, to have a longer life, to pour readily, to have a good shelf life (the materials did not separate on standing) and to provide improved control of the amount of solder applied to the work. These results in the field augment and support the results previously reported from laboratory tests.

As will be evident to those skilled in the art, various modifications on this invention can be made or followed, in the light of the foregoing disclosure and discussion, without departing from the spirit or scope of the disclosure or from the scope of the following claims.

I claim:
1. A composition useful as a soldering oil having at least about 80 weight percent of a refined petroleum hydrocarbon stock from about 3 to 8 weight percent of a fatty acid of from 14 to 20 carbon atoms having one site of olefinic unsaturation, from about 3 to 8 weight percent of a glyceride, having an iodine number in the range of 50 to 90, wherein the carboxylic acids of said glyceride are from 14 to 20 carbon atoms, said glyceride having a smoke point of at least 250° F. and a flash point of at least 500° F., and at least about 0.01 weight percent of a phenolic antioxidant of from 14 to 30 carbon atoms, having from 1 to 2 phenol groups, wherein said final composition has a flash point of at least 450° F., a fire point of at least about 480° F., and a pour point not greater than about 25° F.

2. A composition according to claim 1, wherein said fatty acid is oleic acid and said glyceride is a highly refined lard oil.

3. A composition according to claim 2, wherein said phenolic antioxidant is 4,4'-methylene bis(2,6-di-tert.-butyl phenol).

4. A composition according to claim 3, wherein said phenolic antioxidant is present in from about 0.1 to 0.5 weight percent.

5. A composition according to claim 1, wherein said fatty acid is oleic acid present in about 5 weight percent, said glyceride is lard oil present in about 5 weight percent and said antioxidant is 4,4'-methylene bis(2,6-di-tert.-butyl phenol) present in from 0.1 to 0.5 weight percent.

References Cited

UNITED STATES PATENTS

| 1,859,651 | 5/1932 | Bowers | 148—25 |
| 2,774,137 | 12/1956 | Yarow | 148—25 |

L. DEWAYNE RUTLEDGE, Primary Examiner

T. R. FRYE, Assistant Examiner

U.S. Cl. X.R.

148—23; 252—9